United States Patent
Chiang

Patent Number: 6,154,758
Date of Patent: *Nov. 28, 2000

[54] TEXT CONVERSION METHOD FOR COMPUTER SYSTEMS

[75] Inventor: Mike W. Chiang, San Jose, Calif.

[73] Assignee: Apple Computer, Inc., Cupertino, Calif.

[*] Notice: This patent is subject to a terminal disclaimer.

[21] Appl. No.: 08/242,318

[22] Filed: May 13, 1994

[51] Int. Cl.[7] .......................................... lp;1pG06F 17/21
[52] U.S. Cl. .................... lp;1p707/541; 707/531
[58] Field of Search ..................... 395/144–151; 364/419.1, 419.14, 419.16; 707/530, 531, 541

[56] References Cited

U.S. PATENT DOCUMENTS

| | | | |
|---|---|---|---|
| 4,544,276 | 10/1985 | Horodeck | 400/110 |
| 5,168,533 | 12/1992 | Kato et al. | 382/54 |
| 5,231,698 | 7/1993 | Forcier | 395/146 |
| 5,365,598 | 11/1994 | Sklarew | 382/13 |
| 5,367,453 | 11/1994 | Capps et al. | 364/419.13 |

OTHER PUBLICATIONS

O'Connor, Rory J.; "Apple Banking on Newton's Brain-";*San Jose Mercury News*, Wednesday, Apr. 22, 1992.
Weiman, Liza and Moran, Tom,; "A Step toward the Future"; *Macworld*, Aug. 1992; pp. 129–131.
Soviero, Marcelle M., "Your World According to Newton", *Popular Science*, Sep. 1992, pp. 45–49.
Abatemarco, Fred, "From the Editor", *Popular Science*, Sep. 1992, p. 4.
Lunde, Ken, "Understanding Japanese Information Processing", O'Reilly & Associates, Sep. 1993, pp. 106–107.

*Primary Examiner*—Stephen S. Hong
*Attorney, Agent, or Firm*—Beyer Weaver & Thomas, LLP

[57] ABSTRACT

A method is provided for converting displayed text from one format to another. Text is input as handwriting in a pen-based computer and then automatically converted to a typeface text of a first text domain. Upon receipt of a conversion gesture that is recognized by the system as such, the system automatically converts the displayed text from the first text domain to a second character. The displayed text may be initially written as Hiragana and/or Katakana characters. Upon receipt of a conversion gesture, the system automatically converts the Hiragana and Katakana characters to appropriate Kanji characters.

12 Claims, 11 Drawing Sheets

TEXT CONVERSION METHOD FOR COMPUTER SYSTEMS

BACKGROUND OF THE INVENTION

The present invention relates generally to computer systems capable of recognizing handwriting. More particularly the invention pertains to systems for converting text displayed on computer screens from one text domain to another, such as from Hiragana to Kanji.

Computerized personal organizers are becoming increasingly popular. They perform such functions as keeping calendars, address books, to-do lists, etc. While these functions can be provided by conventional computer systems, they are more conveniently provided by personal organizers which are relatively inexpensive, small, and lightweight (i.e. portable). Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function displays of pen-based computer systems permit users to operate the computers as computerized notepads. For example, graphical images can be input into the pen-based computer by merely moving the stylus across the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, the "ink" can be identified as text and numeric information. Some systems can recognize handwriting (ink) as characters, words, geometric shapes, etc. The recognized characters and words may also be identified as belonging to a particular language (e.g. Russian or English) or to a particular character set (e.g., Greek or Roman letters).

Text written in Japanese can contain alphabetic characters or numerals, but it consists principally of Kanji (Chinese characters) and syllabic characters (Hiragana and Katakana). There are some 2,000 to 3,000 common Kanji, and an additional 3,000 to 4,000 less common Kanji. In general, Kanji are structurally very complex with each single character containing on average from five to ten strokes. Some of the more complicated Kanji can contain 20 or more strokes.

Hiragana and Katakana are phonetic characters commonly used in Japan. Kanji are not phonetically based. Hiragana is reserved for traditional Japanese words that do not derive from other languages. Katakana, on the other hand, is reserved for words that originally found their way into Japanese from foreign languages. In comparison to Kanji, Hiragana and Katakana are generally less complex. Further, there are far fewer of them—only 49 for each of Hiragana and Katakana. Thus, single keyboards containing all of the Hiragana or Katakana are available.

As recently as ten years ago there was no way to input Kanji into a computer. Instead, Katakana characters were assigned to the keys of the ASCII keyboard and Japanese text was input, and displayed, phonetically. Another approach employed a special device consisting of a tablet on which 3,000 Kanji characters were printed. Further research led to systems employing Kana input (phonetic) with subsequent Kana-Kanji conversion.

Two dominant modes of this process are now employed. In the first, an ASCII keyboard is used to input Roman letters which are first converted to phonetic Japanese text (Hiragana or Katakana) and then converted to Kanji using a Kana-Kanji conversion. This approach has the advantage of requiring keyboards having only the 26 letters of the Roman alphabet. In the second dominant mode, Japanese text is input phonetically as Katakana or Hiragana through a keyboard or handwriting and then changed into Kanji using a Kana-Kanji conversion. This approach has the advantage of allowing persons not familiar with Romanization rules to input Japanese text.

Most input methods that use Japanese handwriting recognition allow the user to write the desired Kanji directly. Nevertheless, Hiragana or Katakana are often used in the following cases (1) the user is not sure, or has forgotten, how to write the Kanji, (2) the handwritten Kanji is not recognized by the system, (the order of the strokes used to write the Kanji is incorrect, or some other mistake is made), and (3) the time required to write complicated Kanji characters is too great. However, memos written entirely in Hiragana are difficult to read, thus generally requiring that the user rewrite at least some of the text using Kanji when more time is available. What is required is a method for quickly and easily converting text written in Hiragana or Katakana into Kanji.

SUMMARY OF THE INVENTION

The present invention provides computer systems and methods for using them to convert displayed text from one text domain to another. Typically, text that is input as handwriting is first converted to a typeface text having a first text domain. The "text domain" referred to herein may be a particular "character set" such as the Greek or Roman alphabets, or the Kanji characters. The text domain may also be a word list such as a list of recognized Hiragana words. After the original text has been displayed in the first domain, the user may input a conversion gesture that is recognized by the system as such. Upon noticing a conversion gesture, the system automatically converts the displayed text from the first text domain to a second text domain. In a preferred embodiment, the displayed text is initially written as Hiragana characters. Upon receipt of a conversion gesture, the system automatically converts the Hiragana characters to appropriate Kanji characters.

One aspect of the invention is a method of converting text from one text domain to another text domain in a stylus-based computer. The method includes the following steps: (a) identifying particular text that has been selected on the display screen, (b) determining whether the stylus has been used to enter a conversion gesture for the selected text, (c) determining the source text domain of the selected text, (d) determining an appropriate destination text domain to which the selected text is to be converted, and (e) replacing the selected text on the display screen with text from the destination text domain determined in step d. The conversion gesture may be a checkmark or other appropriate gesture written on the display screen with the stylus. In a preferred embodiment, the step of determining an appropriate destination text domain requires that the destination text domain be Kanji when the source text domain is Hiragana. In an alternative embodiment, the destination text domain will be Hiragana or Katakana when the source text domain is Romaji (Roman alphabet). The step of replacing the selected text with text from a different text domain may include the following substeps: (i) identifying a plurality of candidate text strings from the destination text domain, (ii) ranking those candidate text strings, and (iii) designating a top ranked candidate text string as the replacement for the selected text.

In a preferred embodiment, the method allows the user to select alternative candidate text strings written in the destination text domain. This may be appropriate when the destination text domain contains multiple candidate text strings, each corresponding to the single selected text string written in the source text domain. When this is the case, the user may enter a "correction gesture" which causes the system to display a menu listing at least a portion of the candidate text strings from the destination text domain. The system then determines whether one of the plurality of destination text domain candidates has been selected from the menu, and, if so, it replaces the displayed text with the selected candidate.

Another aspect of the invention provides a system for converting text displayed on a stylus-based computer system from a first text domain to a second text domain. The system includes (a) a display screen which can receive textual information written with a stylus and can display text corresponding to that written information, (b) a recognizer for identifying characters of the first text domain from the written information input with the stylus, and (c) a text extension system for converting displayed characters of the first text domain to characters of the second text domain in response to a conversion gesture. In preferred embodiments, the text extension system contains one or more text extensions each of which causes a defined conversion or group of conversions (e.g., Hiragana or Katakana to Kanji). The text extension system responds to the conversion gesture by first identifying a plurality of candidate text strings each containing characters of the second text domain. These candidates are ranked and the top ranked candidate is displayed on the screen.

The present invention will now be further described in the following detailed description and accompanying drawings.

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
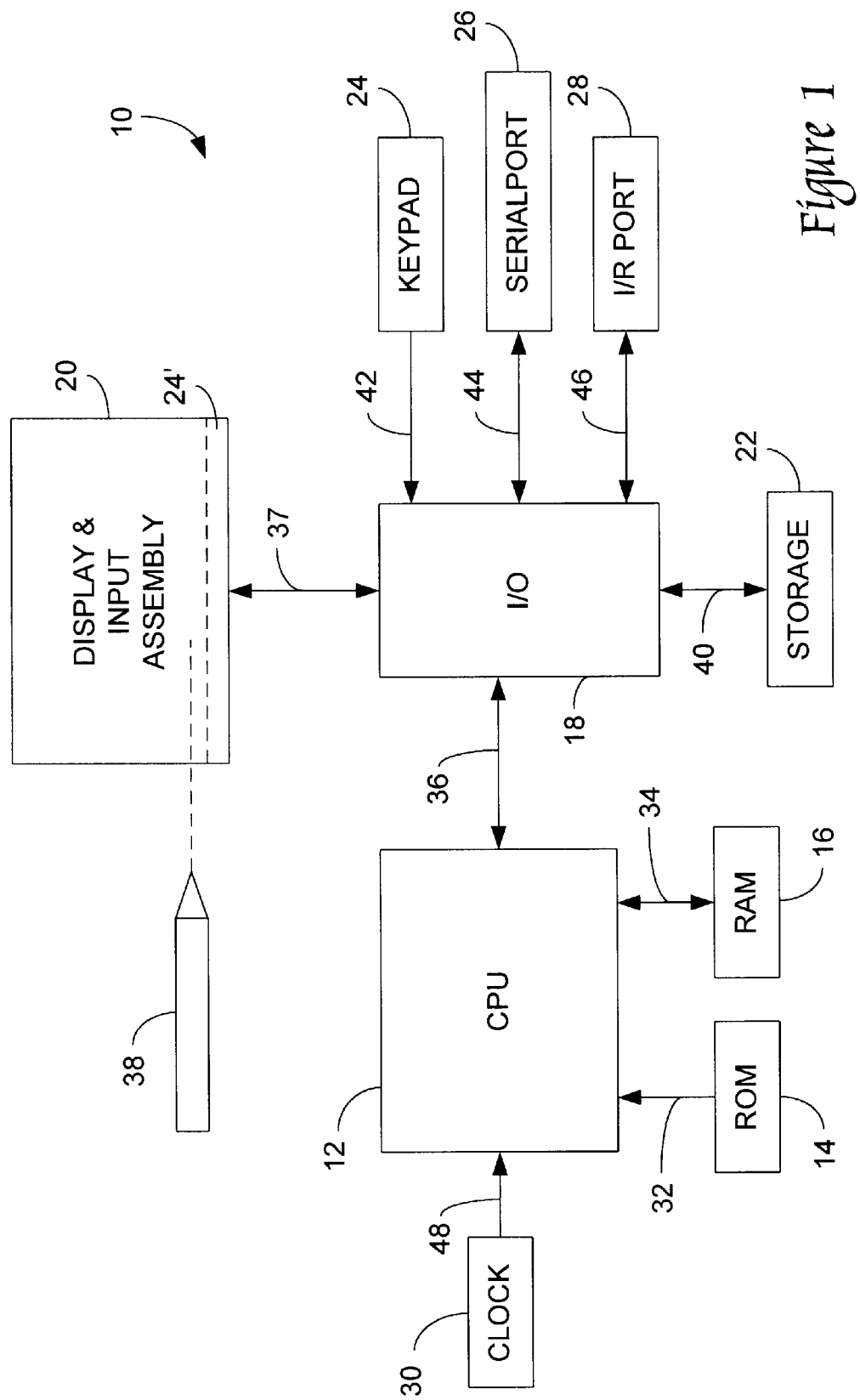
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 38. When operating as an output device, the display assembly 20 receives data from I/O circuitry 18 via bus 38 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
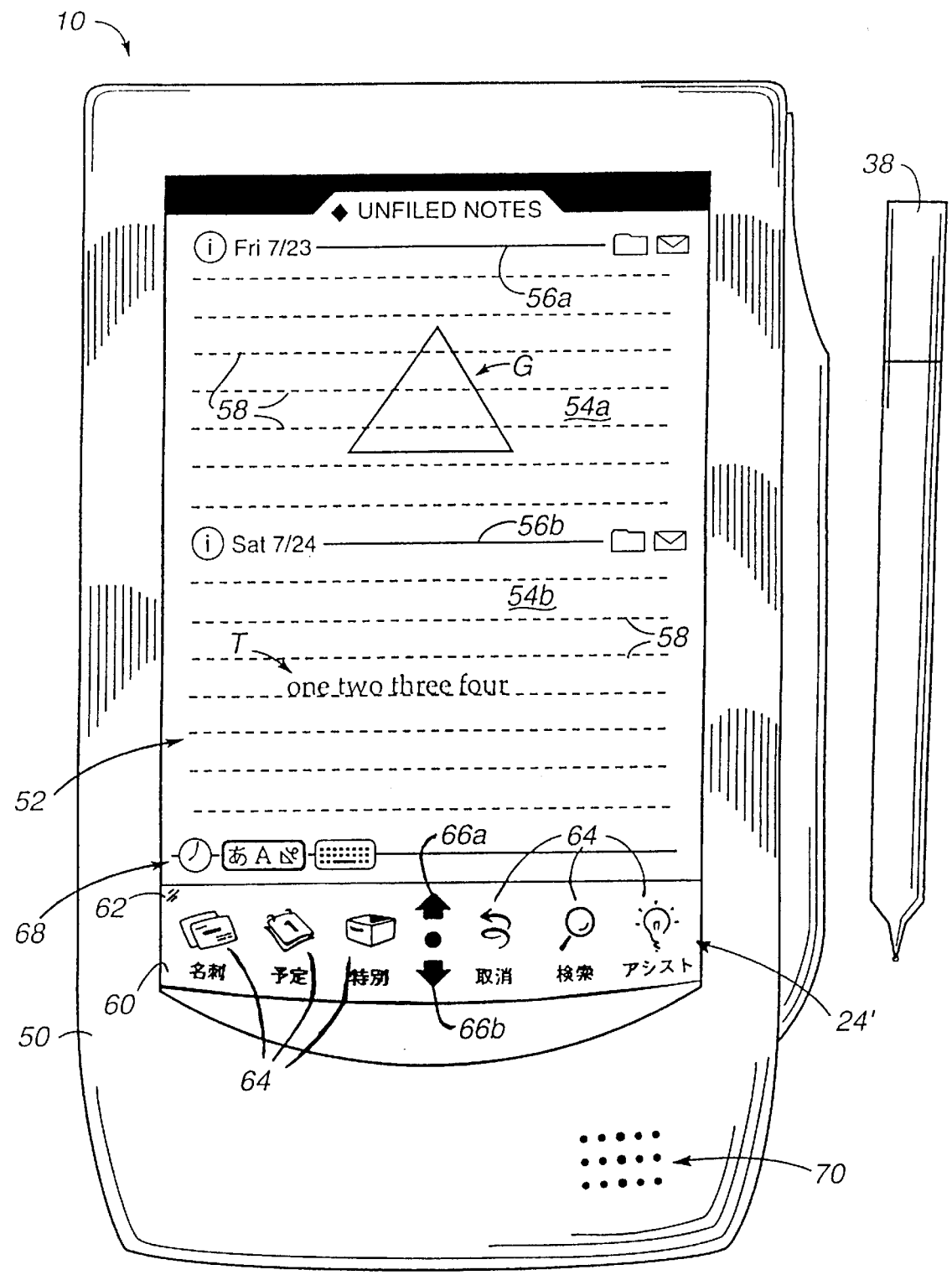
FIG. 2 is a top plan view of the screen, case, keypad, and stylus of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising one two three four has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in copending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, runs within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

The term "object" will occasionally be used in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh,* by Kurt J. Smucker, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation,* by Brachman and Leveseque, Morgan Kaufman, San Mateo, 1985.

It will be noted there is a liberal use of graphic elements in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III,* by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

As used herein, the phrase "text domain" refers to a group of textual elements associated with a single language. The textual elements may be character sets or word lists used in a language. A word list may be provided as a dictionary or collection of dictionaries of words belonging to a particular language. A character set is a collection of characters that are used together in a language, as in the example of an alphabet. For example, the Roman alphabet (sometimes referred to as "Romaji" herein), the Greek alphabet, the Russian alphabet, the Sanskrit alphabet, and the Arabic alphabet are each examples of individual character sets. Some languages such as Japanese, Chinese, and Korean have multiple character sets which may be either phonetic or ideographic. As discussed above, the Japanese language has different character sets for Kanji and Hiragana or Katakana. The character sets used in this invention need not be linguistic. For example, mathematical, numerical, and other symbolic sets may also treated as character sets for purposes of this invention.

Figure 3:
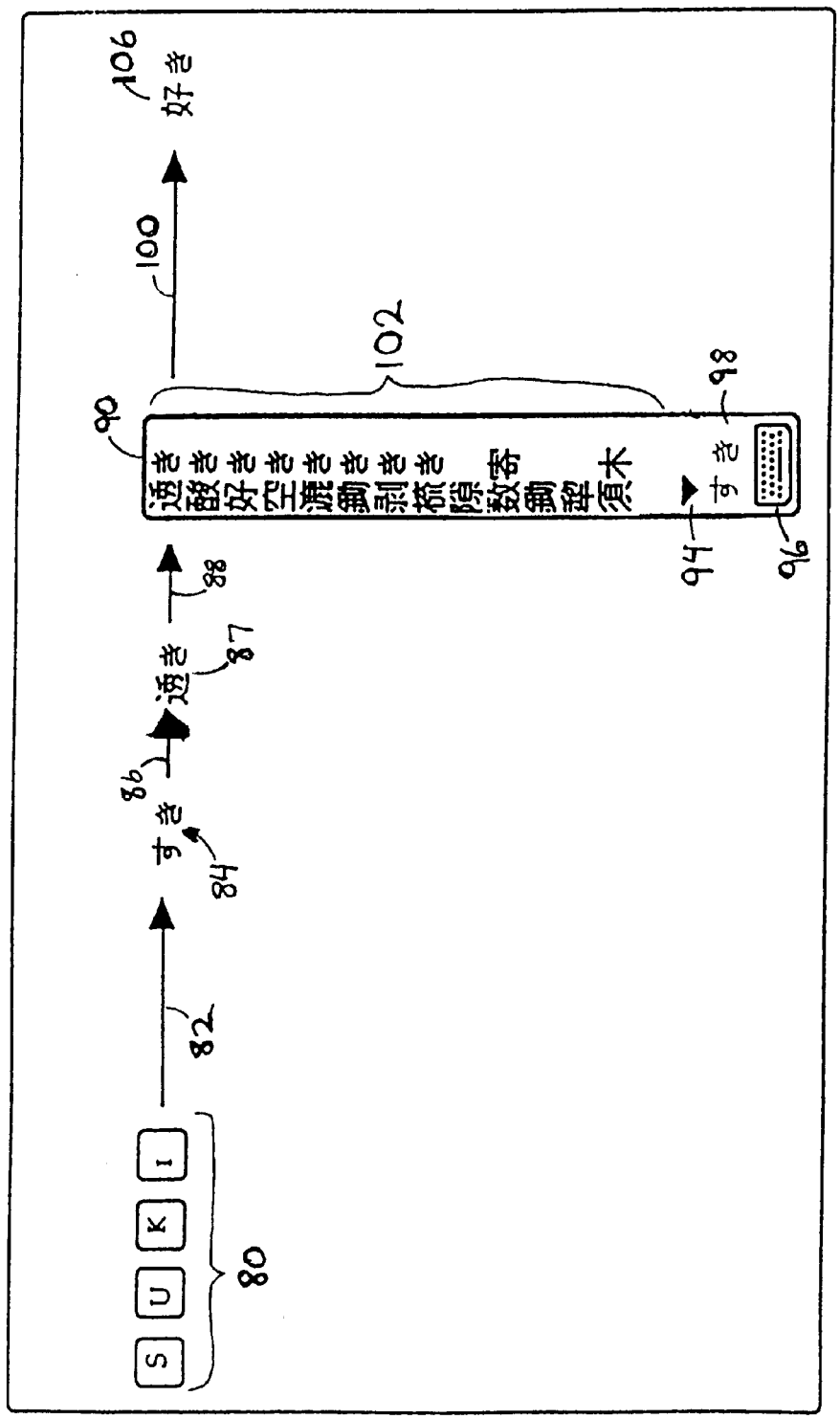
FIG. 3 is an illustration showing how text strings can be converted from one format to another in accordance with a preferred embodiment of this invention.

An example of the present invention as embodied for two different conversions will now be described with reference to FIG. 3. Initially, a user enters a text string in a particular format to which he or she is accustomed. As shown at left side of FIG. 3, the user types the Roman letters "S", "U", "K", and "I" (80) with a software keyboard. As the system identifies Hiragana characters corresponding to the Romaji characters input, the system automatically converts those Romaji characters to the corresponding Hirgana characters. In this example, the Romaji characters "S" and "U" are converted the Hiragana character "su" after the Romaji "U" is entered. Also, the Romaji characters "K" and "I" are converted to the Hiragana character "ki" after the Romaji "I" is entered. This automatic conversion from Romaji to Hiragana is depicted by arrow 82. The user may also enter the Hiragana characters "su" and "ki" 84 directly by writing them on screen 52 with stylus 38.

At this point, the user may be content that the conversion has placed the text in a final form. However, he or she may also find it desirable to further convert the Hiragana text 84 to Kanji text by a Kana-to-Kanji conversion 86. If such conversion is chosen, the user must first select the text to be converted. It should be noted that in addition to SUKI, the user may have entered additional text on screen 52. From among all such text on display screen 52, the user selects the Hiragana letters "su" and "ki" 84 by an appropriate selection gesture (e.g. the stylus is depressed for a short period at a position adjacent to "SUKI" and then moved across the letters). Thereafter, the user enters a conversion gesture (e.g., a checkmark) over the selected text string 84. The system then automatically converts the Hiragana characters 84 in this example to Kanji characters 87 in a step depicted by arrow 86.

In performing this conversion, the system identifies 13 ranked candidate Kanji representations shown in menu 90. Of these 13, the top displayed Kanji is ranked most highly by the system, and initially, only that Kanji appears on the display screen. That is, the system simply replaces the Hiragana text string 84 with the top ranked Kanji 87.

In this example, the user decides that a different Kanji representation is desired. To display the available Kanji candidates, the user enters a correction gesture (depicted by arrow 88) on the initially displayed Kanji. This gesture may be, for example, a double tap on displayed Kanji characters 87. Upon receiving this correction gesture, the system displays menu 90. This menu includes the originally displayed Hiragana characters 98 as well as a scroll button 94, and a soft keyboard 96. The 13 candidate Kanji representations identified by the system are displayed at 102. Upon review of these options, the user determines that the third one is desired. He or she then selects this entry to accomplish conversion 100. This causes the system to replace the originally displayed Kanji text string 87 with the newly selected Kanji text string 106 as desired by the user.

Figure 4:
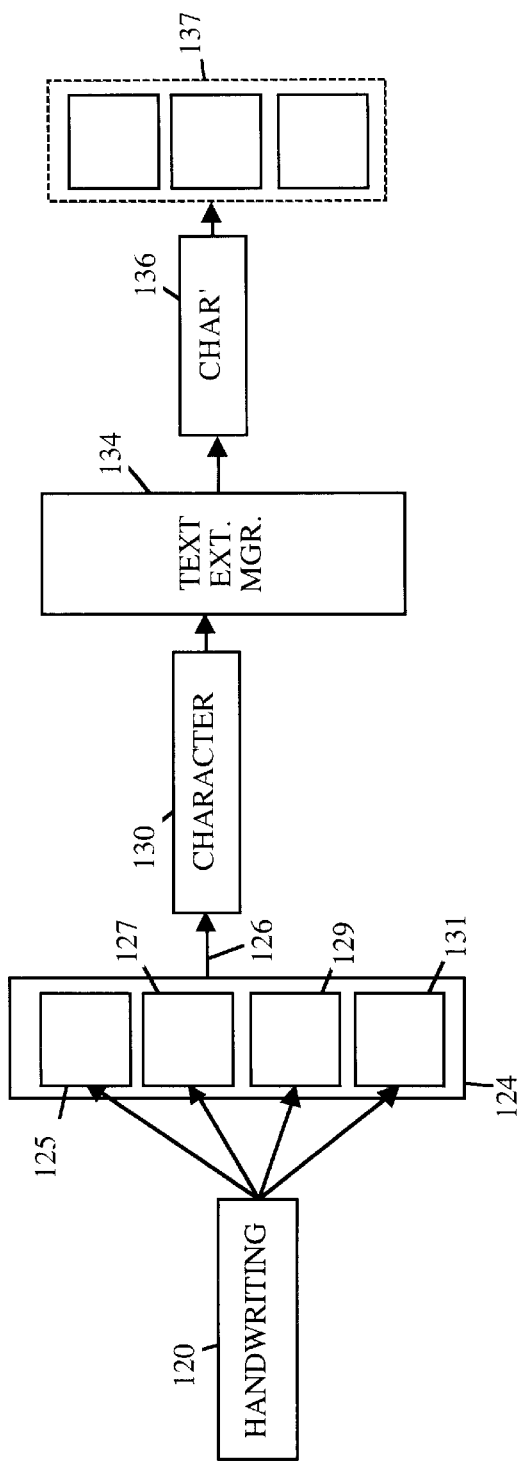
FIG. 4 is an illustration showing how certain elements of a system architecture act in accordance with methods of this invention.

Referring now to FIG. 4, the process of this invention will be described briefly with respect to two important components of the system architecture: a recognizer (or recognition engine) and a text extension system. Initially, a user inputs handwritten characters 120 by writing them on display screen 52. Thereafter, a recognizer 124 containing a plurality of recognition domains 125, 127, 129, and 131 determines the sequence of characters most likely intended by the user. Specifically, one of the recognition domains is identified as providing the text string most likely intended by the user. The various recognition domains may be associated with various text groups such as Japanese words, English words, Spanish words, Sanskrit words, etc. If the user writes in Hiragana, a Japanese language recognition domain should return a typeface text string that better represents the user's intention than a corresponding English language recognition domain. Recognizers are discussed in copending U.S. patent application Ser. No. 08/001,123, filed on Jan. 15, 1993, entitled METHOD AND APPARATUS FOR COMPUTERIZED RECOGNITION, and naming Pagallo et al. as inventors, and Ser. No. 08/068,443, filed on May 27, 1993, entitled METHOD AND APPARATUS FOR RECOGNIZING HANDWRITTEN WORDS, and naming Beernink as inventor. Both of these applications are incorporated herein by reference for all purposes.

After recognition domain 127 from recognizer 124 decides on a most likely character group, a conversion step 126 replaces the handwritten text on display screen 52 with the type face text string 130. Thereafter, the user may decide to convert text string 130 from the displayed text domain to a different text domain (e.g., from Hiragana to Kanji). As noted, the user does this by selecting the character string to be converted and then entering a conversion gesture. After the conversion gesture has been entered, a text extension system 134 processes the conversion. It does so by automatically determining the source text domain (e.g., Hiragana), determining the desired destination text domain (e.g., Kanji), and performing the steps necessary to effect this conversion. Thus, the character string 130 appearing as one text domain is converted to character string 136 which is provided in a different text domain. After the conversion gesture has been entered, the character string 130 will automatically be replaced by character string 136.

In alternative embodiments, the user can specify a desired conversion. Thus, for example, the system may choose a Katakana to Kanji conversion, while the user selects a Katakana to Romaji conversion.

In general, the role of the text extension system is to manage editing and conversion of text strings from one text domain to another text domain. As mentioned, the text domains may be character sets such as Hiragana, Kanji, Romaji, Greek symbols, etc. However, the text domains more often represent word lists of recognized words within a character set. Other text domains handled by the text extension system include spelling lists, such as U.S. English and Britain English. Thus, for example, the text extension system might be capable of converting the U.S. English spelling "color" to the Britain English spelling "colour." In addition, the text extension system can handle format conversions such as converting an extended date format (e.g., May 5, 1994) to an abbreviated date format (e.g., May 5, 1994).

After the text extension system has coordinated the pertinent conversion, the results of that conversion are made generally available to all applications 137 in the system. Although, some previous systems such as the Macintosh Computer contained independent text editing or conversion entities, each application in such systems was required to possess some text handling capability. Thus, if such application needed to enlist the services of a text editing or conversion service, it had to make requests of that service and receive the results each time a text modification was required. In contrast, the text extension system of the present invention manages all text editing and conversion independently of the applications 137. After the text extension system and associated entities have completed their operation on the text, that text is made available to applications 137. Thus the applications do not have to participate in the text conversion process.

Figure 5:
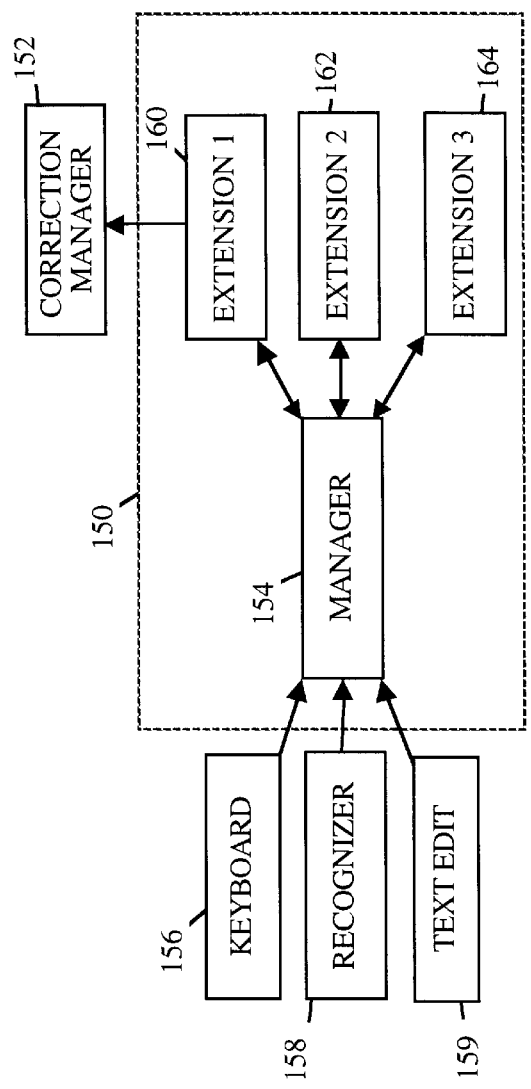
FIG. 5 is an illustration of one element of the system, a text extension system.

FIG. 5, presents further details of a text extension system 150 and associated entities. The text extension system includes two primary parts: a text extension manager 154 and one or more text extensions shown as Extension 1, 160, Extension 2, 162, and Extension 3, 164. Each of these text extensions acts as a filter which controls the conversion of text from one text domain to another. In this example, Extension 1, 160 might control conversion of Hiragana to Kanji, Extension 2, 162 might control conversion of Chinese phoenetic to Chinese ideographic characters, and Extension 3, 164 might control conversion of U.S. English spelling to British English spelling. Other text extensions might control format conversions, numeric conversions, etc. as explained above. Text extension manager 154 manages the text extension system 150 by keeping track of the available text extensions and by designating one of these text extensions as an "active" extension. The "active" extension can be specified by setting a toggle in a system preferences application, by selecting a particular type of keyboard (e.g., one for Hiragana characters), etc. Thus, by choosing a preference setting the user explicitly designates the active extension and by choosing a keyboard, the user implicitly designates the active extension. Another role of the text extension manager 154 is to send information concerning events (e.g., receipt of a conversion gesture) to the active extension.

The various text extensions are removable modules that can be freely added to and deleted from the system by users.

For example, a user might add an extension to the system via a PCMCIA card. When such extension is registered with text extension manager 154, it becomes available to all applications on the system.

Text extension manager 154 receives events and characters from various other system entities including keyboard(s) 156, recognizer 158, and text edit entity 159. Text edit entity 159 handles various text editing functions such as inserts, replacements, deletions, etc. After receiving such events, the text extension manager 154 sends information concerning those events to the active extension. When such information is received, the active extension may act on it as appropriate in its role as a converter or otherwise. For example, the active extension may override the default behavior for a user action, modify text (e.g., according to a conversion), or update its internal state.

The various events which may be handled by an active extension include at least some of the following. A word written by the user and recognized by a recognizer may be received by the text extension manager. The default behavior for this event is for the active extension to append the word to a nearest paragraph or to create a new paragraph if no existing paragraphs are sufficiently close. A particular text extension receiving this event (a new word) may determine that the newly recognized word should be combined with another word, thus overriding the default behavior. Various simple stylus-screen events may also be handled by the active extension. These include a "click" (the stylus 38 is held against the screen 52 and possibly moved), single and double "taps" of the stylus on the screen, and taps on a keyboard key. Correction and conversion gestures (described below) may also be handled by the active extension. It should be noted that while some of the above events are normally entered by writing on a screen, they may also be entered by tapping on a key in a soft keyboard. For example, the "convert" event can be instituted by either a written convert gesture or by a convert key selection from an appropriate soft keyboard.

The individual text extensions can communicate with a correction manager 152 which controls corrections of destination conversions. For example, in FIG. 3, 13 different conversion candidates were listed. The active extension and the correction manager have roles in controlling the availability of these candidates for correction. This aspect of the invention will be explained in more detail below.

Figure 6:
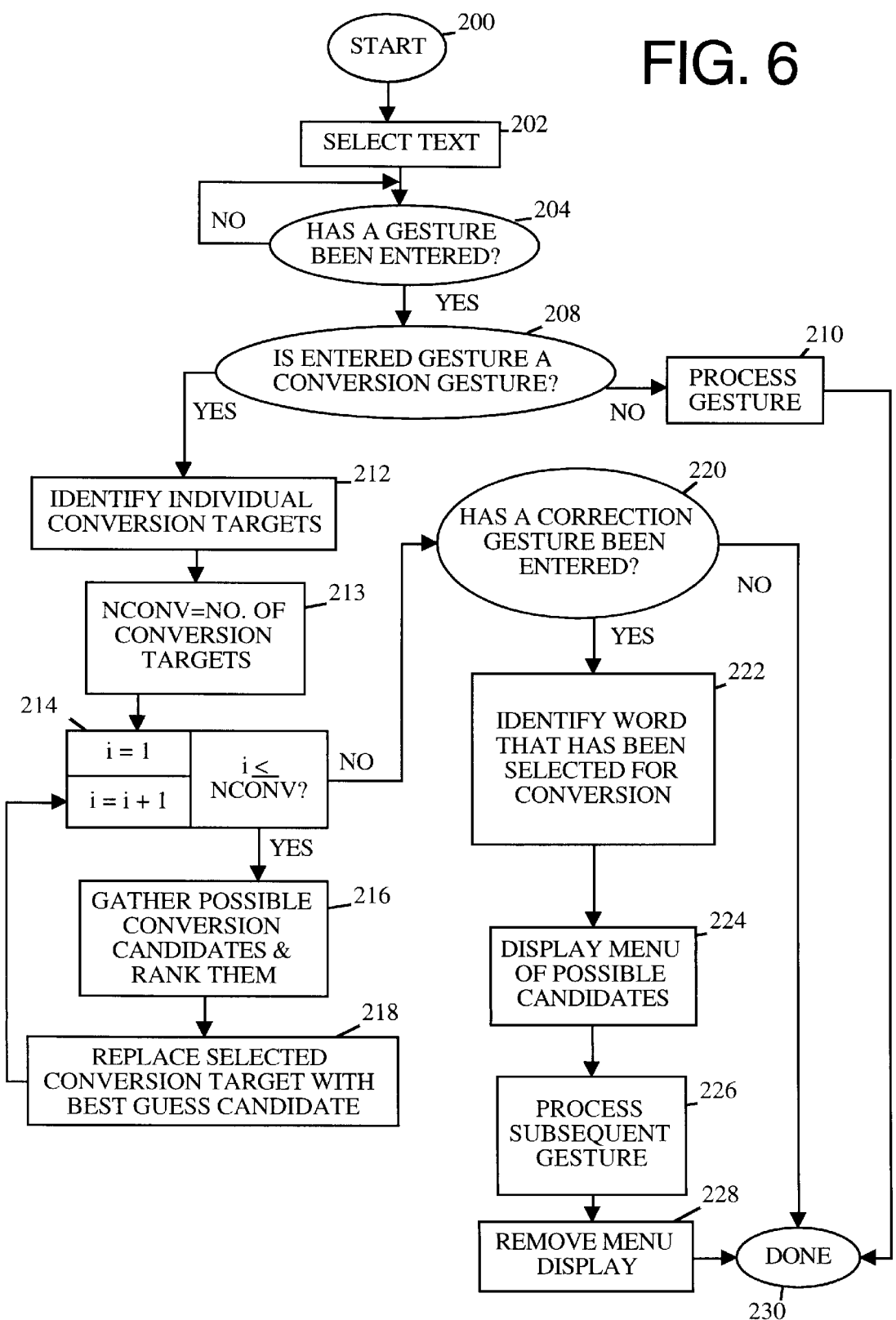
FIG. 6 is a process flow diagram depicting generally a preferred method of this invention.

FIG. 6 presents a flow chart of a preferred conversion method of this invention. The process begins at 200 and in a step 202, text displayed on screen 52 is selected. Thereafter, a decision step 204 determines whether the user has entered a gesture. If not, the system simply waits until a gesture has been entered. If on the other hand, the system detects that a gesture has been entered, a decision step 208 determines whether that gesture is a conversion gesture. This step will be discussed in more detail below. If the entered gesture is any type of gesture aside from a conversion gesture, a process step 210 processes that gesture and the method is completed at 230. If, however, decision step 208 determines that the entered gesture is a conversion gesture, a step 212 identifies the individual conversion targets. For example if the selected text contains multiple words, step 212 identifies each of these words as an individual conversion target. After the individual conversion targets have been identified in step 212, a step 213 sets the variable NCONV equal to the number of conversion targets in the selected text. Next an iterative loop step 214 sets a counter i equal to 1 and determines whether the current value of i is less than or equal to NCONV. If so, a process step 216 gathers one or more candidates for the conversion of the current target, and then ranks them. As discussed previously with reference to FIG. 3, a character string written in one text domain may have many alternative, and correct, corresponding text strings in a destination text domain. Depending upon the context of the text string and other factors, some conversion candidates might be more likely than others. Thus, the system automatically ranks the conversion candidates it identifies.

After the system has identified and ranked possible conversion candidates, it replaces the text string under consideration with its best guess (top ranked) candidate at a step 218. Process control then returns to iterative loop step 214 where the counter i is incremented by 1 and that value of i is then compared with NCONV. Assuming that i is still less than or equal to NCONV, the next target in the selected text is processed in steps 216 and 218 as described above. When the last target in the selected text is processed, the value of i is no longer less than or equal to NCONV, and the decision in step 214 is answered in the negative. Thereafter, a decision step 220 determines whether a correction gesture has been entered for any of the converted words, and if not, the process is completed at 230. However, it is possible that the user did not intend the best guess candidates for all of the conversions. If this is the case, the user may enter a correction gesture such as a double tap on the replacement text string with stylus 38. If decision step 220 determines that the user has indeed entered a correction gesture, a process step 222 identifies the word in the converted text that has received the correction gesture. Usually, this is simply the one on which the user double taps the stylus. After the word to be corrected has been identified, process step 224 displays on screen 52 a menu of the possible candidates identified in step 216. Thereafter, a step 226 processes any subsequent user gestures entered on a display screen. The details of this step will be discussed below. For now, it is sufficient to recognize that the user can select one of the candidates from the menu for display on screen 52. After the appropriate processing of any gestures, a process step 228 removes the menu from display 52 and the process is completed at 230. It should be recognized that each converted word will have its own list of candidates and an associated menu for correction.

As noted in connection with the discussion of FIG. 6, a step of selecting text (step 202) is performed as part of the preferred embodiment. Various techniques for selecting text from a computer screen are known in the art. Many of these are discussed in U.S. patent application Ser. No. 07/888,741, filed on May 26, 1992, naming Capps, as inventor, entitled SELECTING OBJECTS ON A COMPUTER DISPLAY and incorporated herein by reference for all purposes. For example, the user may press the stylus against screen 52 for a short period of time (e.g., a few seconds) and then drag the stylus along the text to be selected. Another selection method includes a step of drawing a circle around the text to be selected. In some embodiments, the selected text need not be contiguous. For example, the first and last words of a sentence may be selected.

Also as noted in connection with the discussion of FIG. 6, various gestures may be recognized by the systems of this invention. Such gestures include caret gestures (horizontal and vertical) which insert spaces or carriage returns in a paragraph, highlight gestures which select items, drag gestures which move selected items, resize margins gestures, etc. Another gesture, a "collapse white space" gesture, compacts selected text by purging unnecessary spaces between successive words and lines. These and other gestures are discussed in (1) U.S. patent application Ser. No. 07/985,588, filed Dec. 3, 1992, naming Beernink et al. as inventors, and entitled GESTURE SENSITIVE BUTTONS FOR GRAPHICAL USER INTERFACES, (2) U.S. patent application Ser. No. 08/070,094, filed on May 27, 1993, naming Capps et al. as inventors, and entitled METHOD OF DELETING OBJECTS ON A COMPUTER DISPLAY, and (3) U.S. patent application Ser. No. 07/888,741, filed on May 26, 1992, naming Capps as inventor, and entitled METHOD FOR SELECTING OBJECTS ON A COMPUTER DISPLAY. Each of these applications is incorporated herein by reference for all purposes.

Figure 7A:
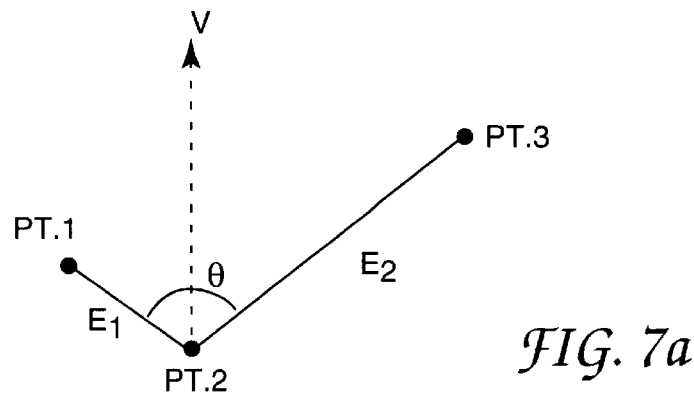
FIGS. 7a and 7b are illustrations of checkmark conversion gestures for use in methods for this invention.
Figure 7B:
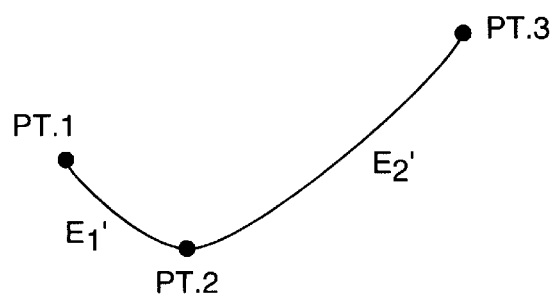
Figure 7C:
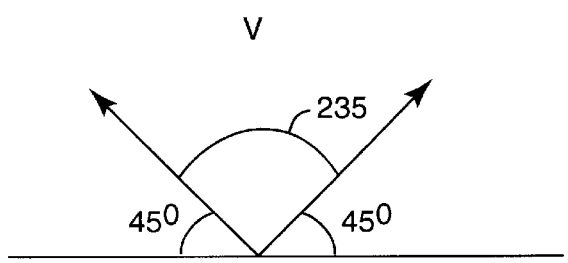
FIG. 7c is an illustration showing the proper orientation for a checkmark gesture of the type shown in FIGS. 7a and 7b.
Figure 8:
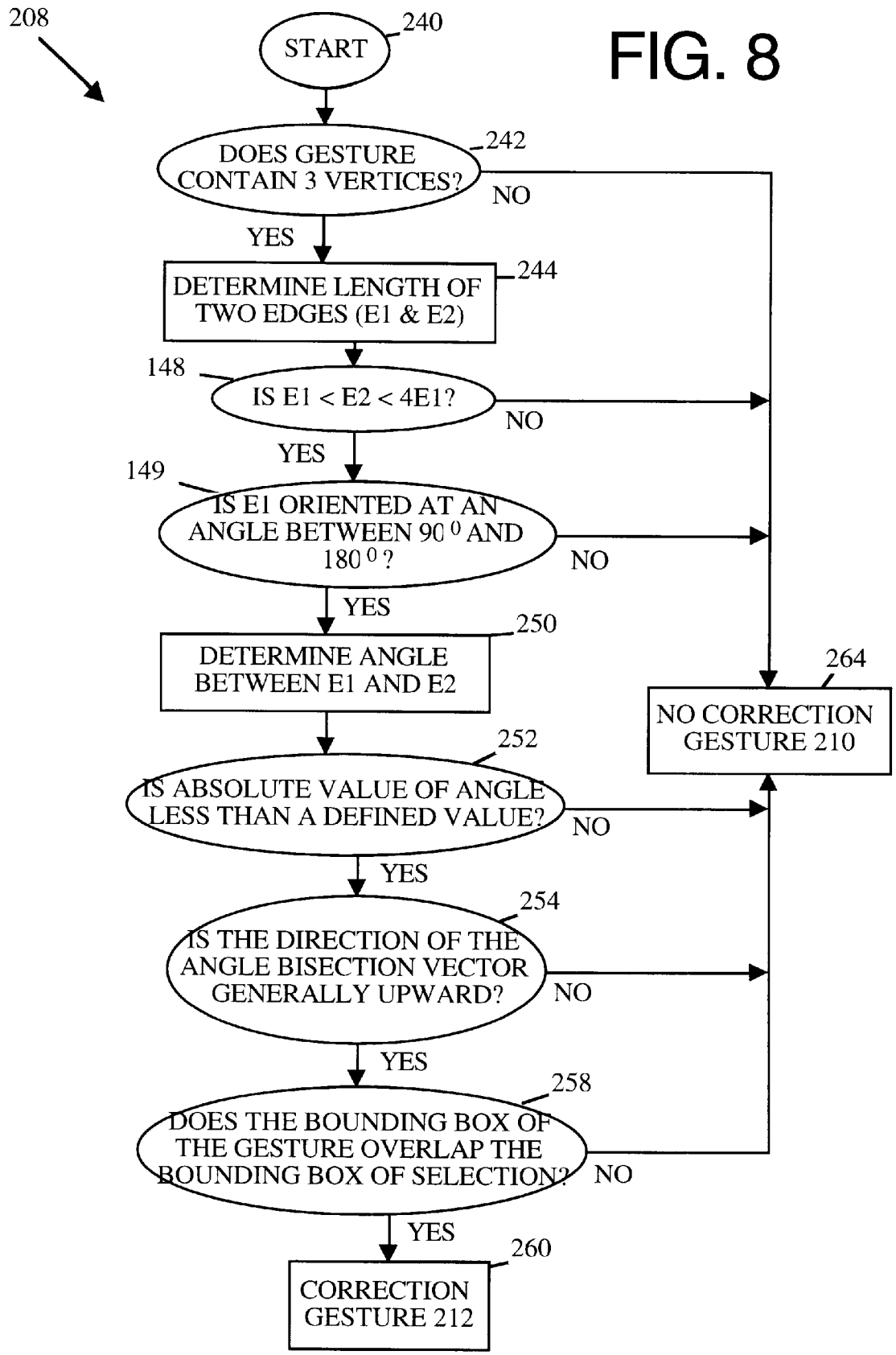
FIG. 8 is a process flow diagram detailing the steps used by the system to determine whether a gesture is in fact a conversion gesture.
Figure 9:
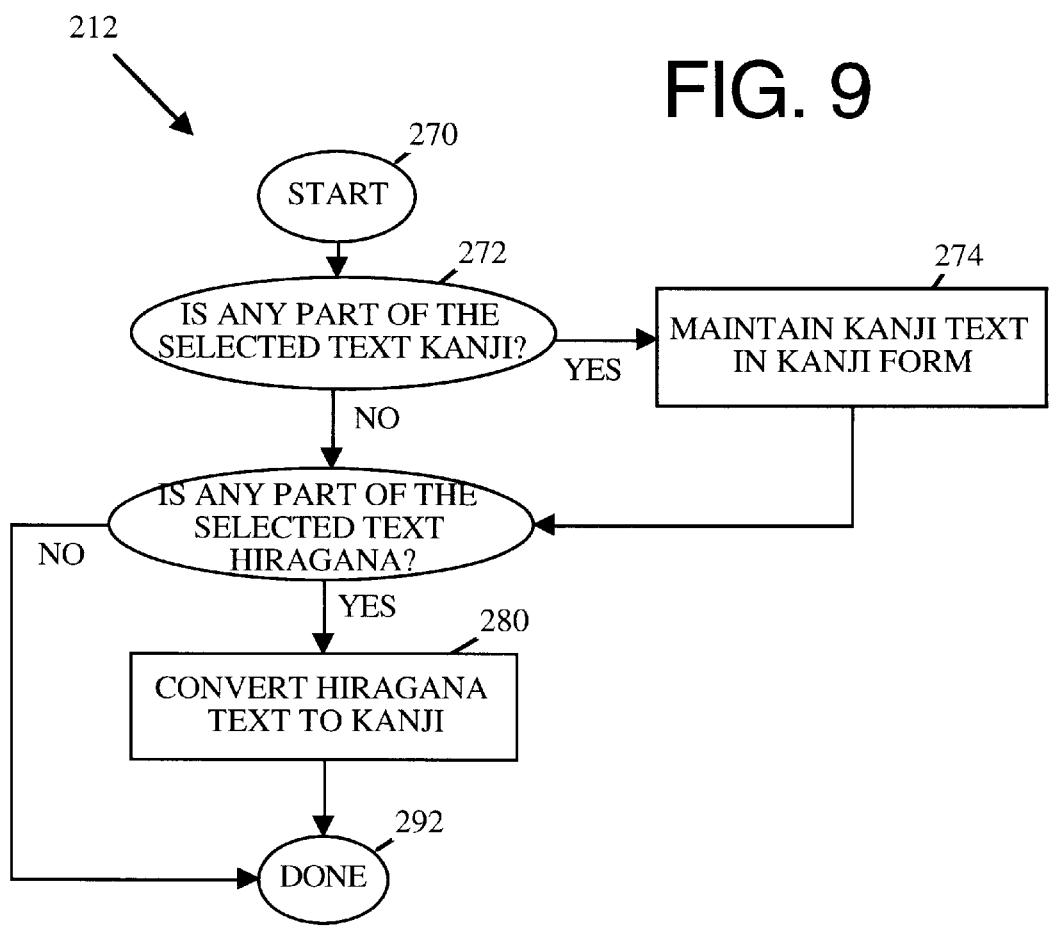
FIG. 9 is a process flow diagram detailing how the system determines which formats are to be used in the conversion according to a preferred embodiment of this invention.

The process of determining whether a gesture is a conversion gesture is detailed in FIGS. 7 and 8. It should be recognized that the checkmark gesture described with reference to these figures is only one type of gesture that might be used to effect a conversion of a text string from one text domain to another text domain. Further, in alternative embodiments the conversion gesture may have additional functions (beyond signaling a conversion) such as selection of a text string for conversion. In this embodiment, the user would not have to perform separate steps of selecting text and entering a conversion gesture. With a single gesture, the user would both select the text string to be converted and instruct the system that a conversion is to be effected. One such gesture includes a line defining a path through the selected text followed by a checkmark. Both the line and checkmark are provided as parts of a single pen-down stroke.

A suitable checkmark for use a as conversion gesture is shown in 7a. As can be seen, the checkmark includes three vertices, pt. 1, pt. 2, and pt. 3 defining two sides E1 and E2. The checkmark gesture also has an associated angle theta between sides E1 and E2. Still further, the checkmark gesture is defined by an orientation or direction V. This direction is determined by bisecting angles theta with a vector pointing away from vertex pt. 2.

Although, the checkmark gesture shown in FIG. 7a has straight sides E1 and E2, suitable gestures may have somewhat curved sides. For example, the checkmark shown in 7b contains somewhat curved sides E1' and E2'.

In a preferred embodiment, the process for determining whether a conversion gesture has been input is shown in FIG. 8. This process corresponds to decision step 208 of FIG. 6. The process begins at 240 and in a decision step 242 determines whether the gesture contains three vertices (e.g., pt. 1, pt. 2, and pt. 3). If not, the process is completed at 264 with the system concluding that the input gesture is not a conversion gesture. This conclusion is equivalent to answering decision step 208 of FIG. 6 in the negative. If, however, the gesture does include three vertices, a process step 244 determines the lengths of the gesture's two edges (E1 and E2). Next, a decision step 248 determines whether side E2 is (1) greater in length than side E1, and (2) shorter in length than 4 times side E1. If side E2 does not meet these criteria, the process is completed at 264 as described above.

Assuming that the sides of the gesture meet the above criteria, a decision step 249 determines whether side E1 is oriented at an angle of between 90° and 180° (i.e., it is located in the second quadrant). If not, the gesture is not a correction gesture and the process is completed at 264. If however, side E1 is oriented at an angle of between 90° and 180°, a process step 250 determines the total angle theta between sides E1 and E2 (corresponding to the angle theta shown is FIG. 7a). Next, a decision step 252 determines whether the absolute value of angle theta is less than a predefined value. It has been found that a predefined angle of about 100° works well. If, the absolute value of the angle is greater that this predefined value, the gesture is deemed to not be a conversion gesture and the process is concluded at 264 as described above. Assuming, however, that decision step 252 is answered in the affirmative, a decision step 254 determines whether the direction or orientation of an angle bisection vector points generally upward. This angle bisection vector is shown as V in FIG. 7a. A preferred range of directions for vector V is shown as arc 235 in FIG. 7c. This corresponds to any angle between 45° and 135°. If the angle bisection vector does not meet this criteria, the gesture under consideration is not a conversion gesture and the process is completed at 264. If, on the other hand, the angle bisection vector does meet this criterion, a decision step 258 determines whether a bounding box surrounding the gesture overlaps a bounding box surrounding the selected text string. As used herein "bounding box" is a minimum rectilinear box surrounding an object displayed on screen 52. Generally, a bounding box is not displayed on the screen but simply serves to delineate the area associated with a particular object such as a character, a word, a gesture, a figure, etc. If the bounding box is of the gesture and the selected text string do not overlap (i.e., decision step 258 is answered in the negative), the gesture under consideration is not a correction gesture and the processes is completed at 264. On the other hand, if the bounding boxes do overlap, the gesture under consideration does indeed define a correction gesture and the process is concluded at 260. This corresponds to answering discussion step 208 of FIG. 6 in the affirmative.

After the system has determined that the entered gesture is in fact a conversion gesture, it must identify the individual words in the selected text. Each such word represents a separate conversion target, which may or may not be converted depending upon the heuristics of the conversion engine. Various techniques are known for identifying individual words within a selected text stream. For example, two groups of characters separated from one another by spaces, commas, or periods would be considered as belonging to separate words. Such a rule is equally applicable to Japanese and English language text. However, it should be noted that the Japanese language period and the English language period are represented by slightly different symbols.

After the system has identified the words available for conversion, it must next perform the intended conversion. FIG. 8 presents a flow chart detailing a process for determining whether to convert each individual word from a group of selected Japanese words. The process begins at 270 and in decision step 272 determines whether any part of the selected text is in Kanji format. It is possible that some parts of a selected text string are written in one text domain and other parts of a text string are written in other text domain. In Japanese, for example, it is common for printed text to contain a mixture of Kanji, Hiragana, and Katakana. If decision step 272 determines that some part, or all, of the selected text is indeed Kanji, a process step 274 ensures that that portion of the text originally written in Kanji remains in Kanji format. Regardless of whether or not some part of the text is originally in Kanji, the system next determines whether any part of the selected text is written in Hiragana at decision step 276. If indeed some part of the text is Hiragana, a process step 280 converts that text to Kanji. Thereafter, he process is completed at 292.

In an alternative embodiment, multiple conversions are possible. In such situations, the system must determine what conversion is appropriate under the circumstances. For example, when Romaji text is input in a Japanese language system, the system might have the option of converting it to Katakana or Hiragana. The system might select the appropriate conversion by examining the particular word(s) to be converted. If that word is typically written in Hiragana text (i.e., it is a traditional Japanese word), the system determines that a Romaji to Hiragana conversion is appropriate. If, on the other hand, the word to be converted is of foreign origin (e. g., the word is "tomato"), the system determines that the conversion is Romaji to Katakana. If the selected text is Hiragana or Katakana, the system might assume that the appropriate conversion is to Kanji. Other rules may be appropriate depending upon the context of the originally input text.

After the appropriate type of conversion has been determined, the system must actually decide which characters are appropriate conversion candidates. As pointed out in the discuss associated with FIG. 3, there may be multiple candidates for a given conversion from, for example, Hiragana to Kanji. This process is represented by process step 216 of FIG. 6. Generally, this process involves looking up the selected characters (words) in a dynamic dictionary chain. Such chain might include a standard dictionary, a name dictionary, a legal dictionary, a user-defined dictionary, etc. linked together. Each such dictionary containing a word in the destination text domain, adds that word to the list of candidates. Systems which perform word/character conversions are well known and used in such products as the Wizard model numbers PV-F1 and PI-3000 available from Sharp Corporation. Further, the book "Japanese Information Processing," by Ken Lunde (which is incorporated herein by reference for all purposes) describes conversion techniques at pages 106–107.

In some embodiments, the active text extension limits the dictionaries available for the conversion. For example, if the text to be converted is entered in a name field of a document, only the "names" dictionary would be consulted in the conversion.

As mentioned in connection with the discussion of FIG. 6, the system automatically replaces selected text with a best guess candidate for conversion. However, the user may not be satisfied with this best guess and may actually want to use one of the other candidates that was not initially displayed on the screen 52. If the user enters a correction gesture (e.g., by double tapping on the replacement text), a menu is displayed listing at least a portion of the conversion candidates. Of course, it is possible that the system would have only identified one conversion candidate. In that case, the best guess conversion candidate would have been the only candidate displayed on the menu.

Figure 10:
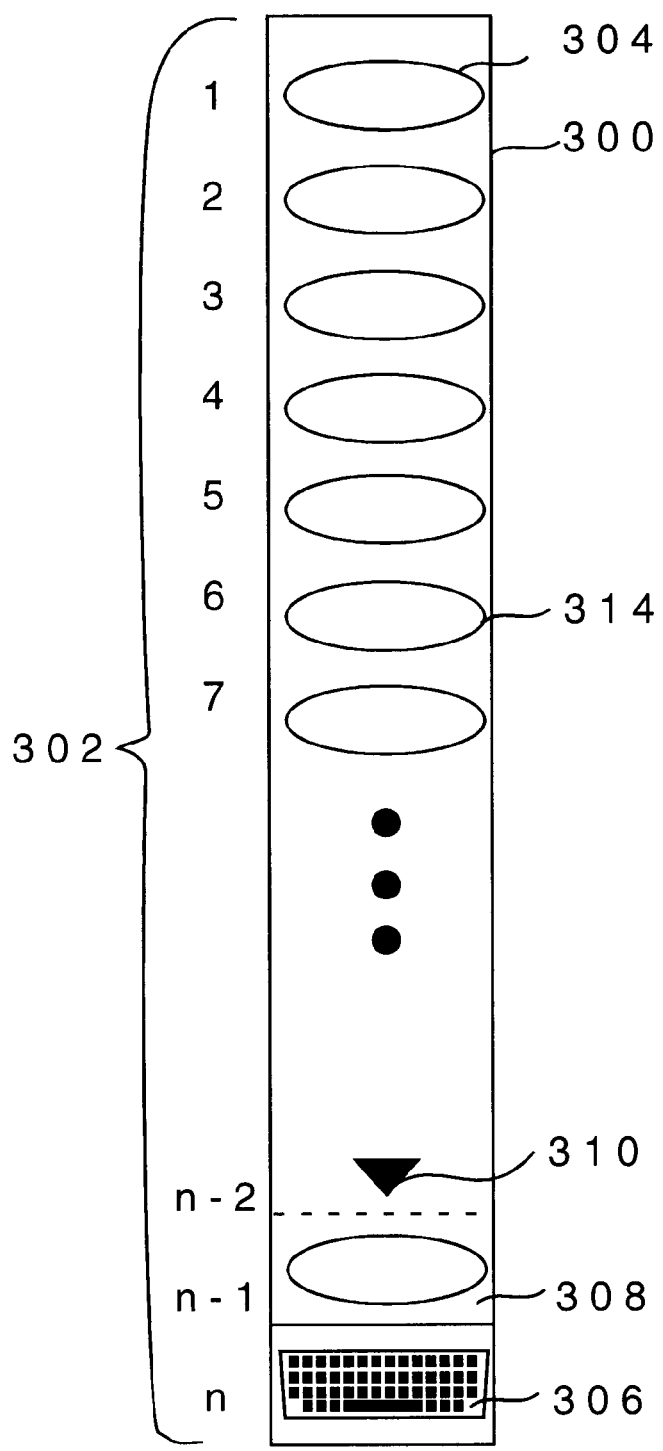
FIG. 10 is an illustration of a menu displayed in response to a correction gesture.

FIG. 10 shows the general arrangement of a menu displayed in response to a correction gesture. The menu is generally displayed in elongated rectangular window 300. The various items in the menu are referenced by the system according to their vertical spacing and associated reference numbers 302. The best guess candidate is displayed in first position 304 (highest vertical location in window 300). Other candidates are displayed below position 304 in the order of their ranking. Thus, for example, the sixth ranked candidate would be displayed in position 314. At the very bottom of the menu, a soft keyboard 306 containing character keys of the destination (i.e., conversion) text domain is displayed. Immediately, above keyboard 306 is position 308 which is occupied by the selected text to be converted. This text string will be displayed in the first (i. e., unconverted) text domain. Above position 308 is a dotted line and then above that is arrow 310. Arrow 310 is used for scrolling through large lists of candidates. In a preferred embodiment, there are 12 positions available for displaying the candidates for conversion. Thus, if there are 13 or more candidates, the candidates in addition to the first 12 are accessed by selecting arrow 310.

Figure 11:
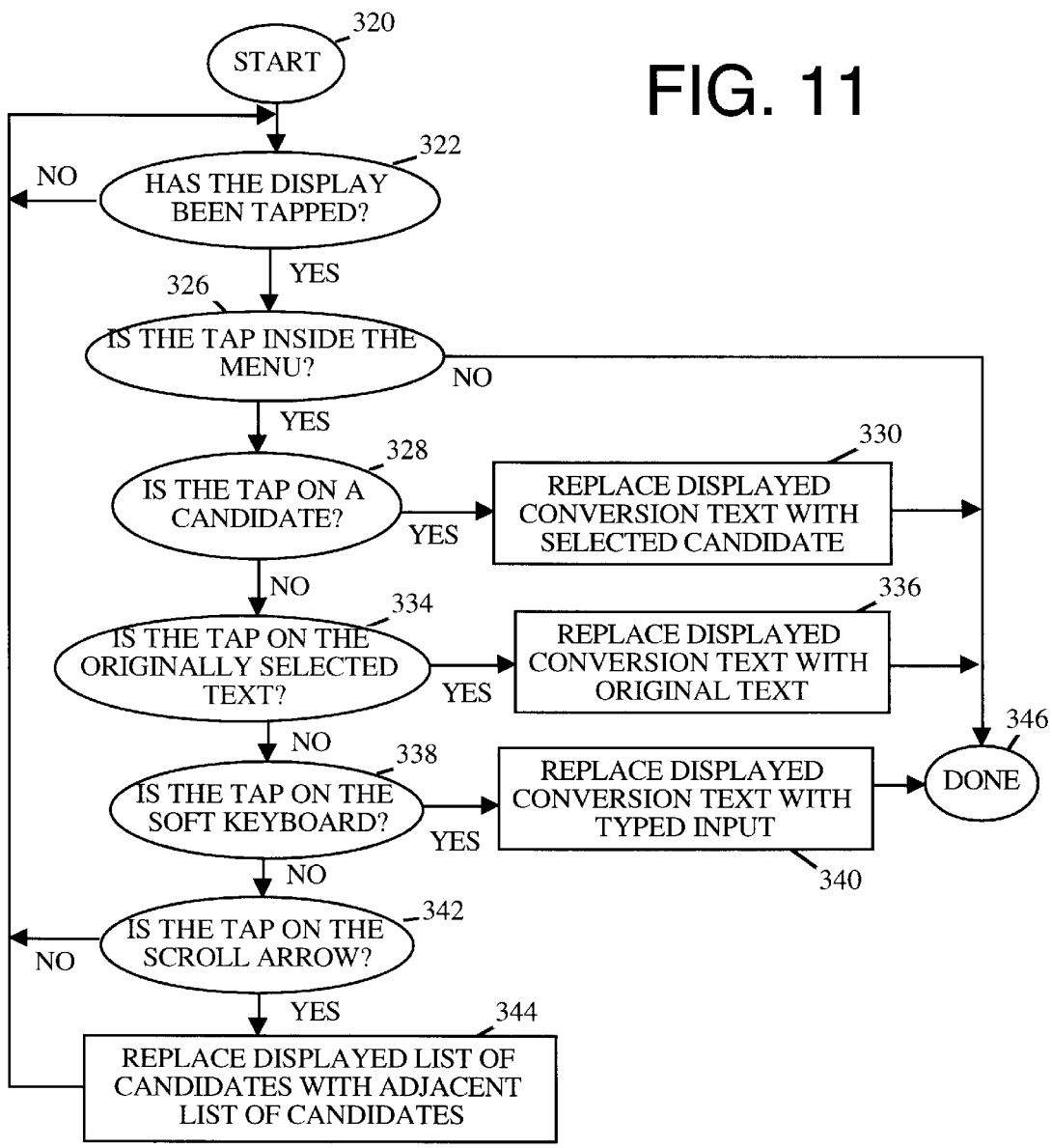
FIG. 11 is a process flow diagram detailing the steps by which the system handles user inputs on the menu shown in FIG. 10.

FIG. 11 details the process of interpreting user gestures with respect to the menu shown FIG. 10. In other words, FIG. 11 describes process step 226 of FIG. 6 in greater detail. The process begins at 320 and in a decision step 322 determines whether the display screen 52 has been tapped. If not, the system simply waits until a tap has been detected. It should be noted that gestures other than tapping may be used to select items on a menu. However, in the preferred embodiment described herein, tapping is used to select items form the menu.

Assuming that the display 52 has been tapped, decision step 326 determines whether that tap was made within the bounds of menu 300. If not, the process is completed at 346. As discussed in connection with FIG. 5 this results in the menu being removed from display 52 . Assuming that the tap has indeed been made inside the menu, a decision step 328 determines whether the tap was made on one of the candidate text strings. If so, a process step 330 replaces the displayed text with the selected candidate. Thereafter the process is completed at 346. If the tap is not on any candidate, a decision step 334 determines whether it is on the originally selected text at location 308. If so, the displayed text string is replaced with the original, unconverted text in step 336. Thereafter, the process is completed at 346. If the tap is neither on a candidate nor the originally selected text, a decision step 338 determines whether it was made on the soft keyboard 306. If so, a process step 340 replaces the displayed text string with input typed from an expanded version of keyboard 306. Thereafter, the process is completed at 346. In a preferred embodiment, process step 340 involves first replacing the menu with an enlarged version of the soft keyboard on screen 52, and then entering the keystrokes input by the user.

If decision step 338 is answered in the negative, a decision step 342 determines whether the tap was made on scroll arrow 310. If not, the system simply returns process control to decision step 322. If the scroll arrow has been tapped, however, a process step 344 replaces the displayed list of candidates with an appropriate adjacent list of candidates. Arrow 310 displayed in FIG. 10 shows only a downward scroll option. This is appropriate for the top ranked list of candidates. However, when the second and subsequent listings of candidates are displayed in menu 300, a corresponding upward scroll arrow (pointing upward whether than downward) will also be displayed. Thus, if a user selects the upward scroll button, the previous listing of candidates will be redisplayed in menu 300. After process step 344 replaces the displayed list of candidates with the appropriate adjacent list of candidates, process control returns to decision step 322 to await further taps from the user.

Figure 12:
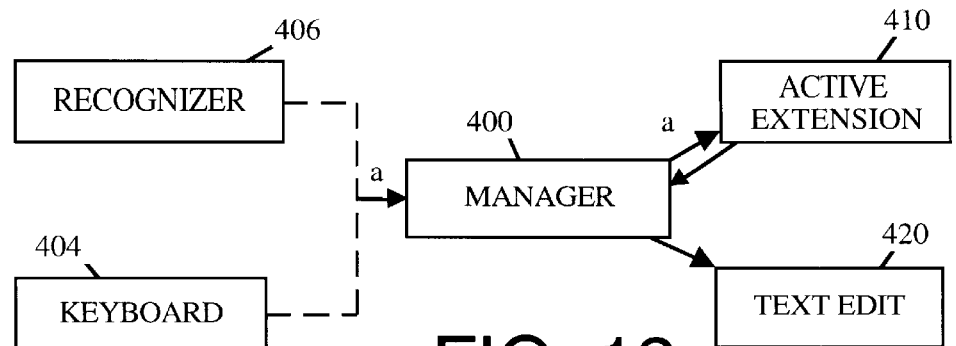
FIG. 12 is an illustration depicting how a text extension system of this invention handles a key entry and subsequent conversion of a character.

Three examples will now be provided to illustrate how the text extension system of this invention handles various events. FIG. 12 illustrates a scenario in which a key entry is handled. A key entry may originate from either a recognizer 406 which recognizes handwritten input or from a keyboard 404 which excepts a key stroke. Either way, the entered key stroke (illustrated by character "a" in this example) is transmitted to text extension manager 400 which keeps a list of the available text extensions, including active extension 410. Upon receiving the character, text extension manager 400 directs that character to active extension 410. The active extension thereupon converts the Roman alphabet character to a corresponding Hiragana character, and directs the converted character back to text extension manager 400. The manager 400 then directs the converted character to the text edit entity 420 which is responsible for displaying the converted character on display screen 52.

Figure 13:
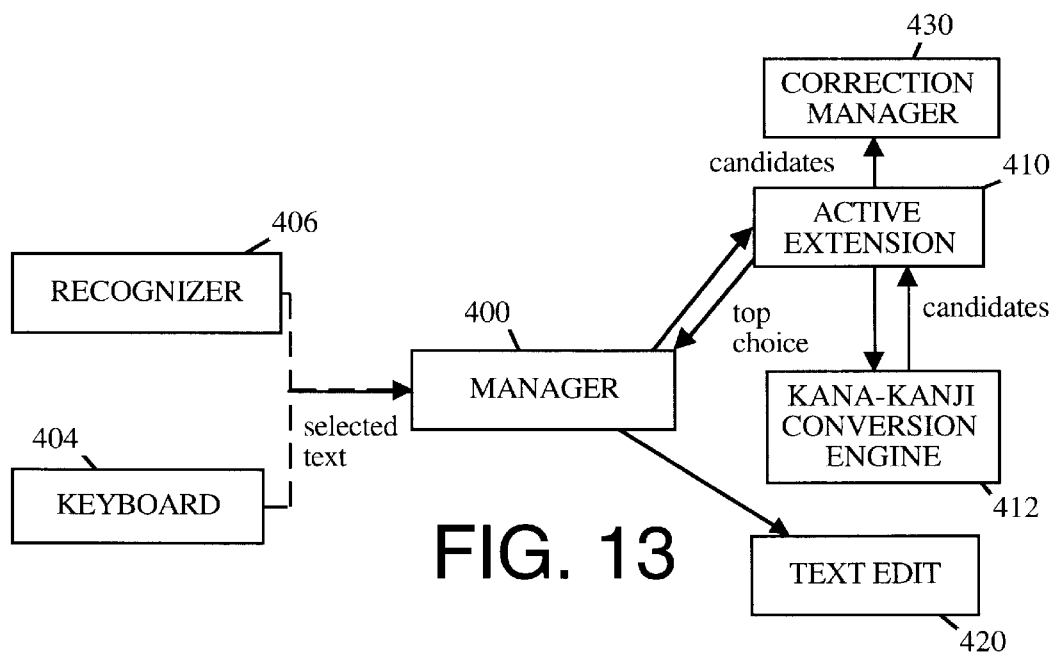
FIG. 13 is an illustration depicting how a text extension system of this invention handles the conversion of a selected word.

FIG. 13, illustrates a more complicated situation in which at least one entire word has been selected and thereafter specified for conversion. Again, the selected text may be input through either recognizer 406 or keyboard 404. Either way text extension manager 400 receives it and then directs it to active extension 410. In this case, the active extension includes a Kana-Kanji conversion engine 412. When the active extension 410 receives the selected target text, it delivers it to the Kana-Kanji conversion engine 412 which in turn generates a list of ranked candidates for the conversion. These candidates are then delivered back to active extension 410 which passes them on to a correction manager 430. The correction manager 430 maintains a list of the candidates for subsequent correction if such correction becomes necessary. At the same time that the active extension 410 is delivering the candidates to the correction manager 430, it is also sending the top ranked candidate back to text extension manager 400 which then relays it to text edit 420. Text edit 420 then displays the top ranked candidate on display screen 52.

Figure 14:
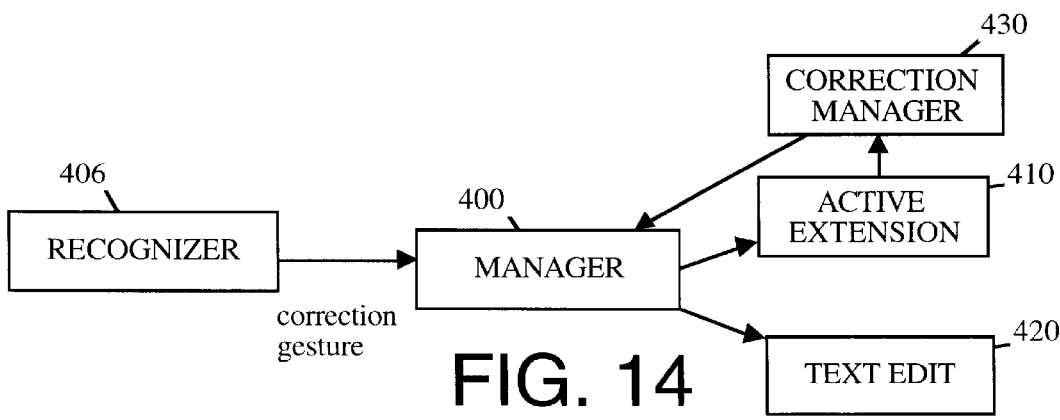
FIG. 14 is an illustration depicting how a text extension system of this invention handles correction of a word.

FIG. 14, illustrates how the text extension system and associated system elements entities handle a correction event. Initially, the recognizer 406 transmits a correction gesture to text extension manager 400. As noted, such correction gesture may be a double tap on one word appearing on the display screen. After text extension manager 400 has received notification of the correction gesture, that information is passed to active extension 410 which then forwards it to correction manager 430. The correction manager 430 then handles the interaction with user inputs as necessary to effect an intended correction. The details of this process were spelled out in connection with FIG. 11. After the appropriate correction has been identified by the correction manager, that information is passed back to text extension manager 400 which then relays it to text edit 420. The correction will then appear on display screen 52. The text extension manager 400 also provides the correction information to active extension 410 for update purposes.

While this invention has been described in terms of several preferred embodiments, there are alterations, permutations, and equivalents which fall within the scope of this invention. It should also be noted that there are many alternative ways of implementing the processes of the present invention. For example, much of the programming can be simplified by using the high-level utilities and data structures mentioned in the preceeding specification. In particular, the described frame database system is preferred for simplifying the programming tasks required by the computer implemented processes of the present invention, but there are many other database and graphics systems which can be used to accomplish the same task.

It is therefore intended that the following appended claims be interpreted as including all such alterations, permutations, and equivalents as fall within the true spirit and scope of the present invention.

What is claimed is:

1. A method of converting characters from one text domain to another text domain in a stylus-based computer in which information may be entered by interaction of a stylus with a display screen, the method comprising the following steps:

(a) identifying text that has been selected on the display screen;

(b) determining whether the stylus has been used to enter a conversion gesture for converting the selected text on the display screen from a source text domain to a destination text domain;

(c) determining the source text domain of the selected text;

(d) determining an appropriate destination text domain to which the selected text is to be converted; and (e) replacing at least a portion of the selected text on the display screen with text from the destination text domain determined in step d, wherein the step of replacing at least a portion of the selected text on the display screen include the following steps:

identifying a plurality of candidate text strings from the destination text domain;

ranking those candidate text strings; and designating a top ranked candidate text string to be used in replacing the selected text.

2. The method of claim 1 wherein the step of determining an appropriate destination text domain requires that the destination text domain be Hiragana or Katakana when the source text domain is Romaji.

3. The method of claim 1 wherein the step of determining an appropriate destination text domain requires that the destination text domain be Kanji when the source text domain is Hiragana or Katakana.

4. The method of claim 1 wherein the selected text contains characters from at least two different text domains and the step of determining an appropriate destination text domain to which the selected text is to be converted requires replacement of characters from fewer than all of the at least two different text domains in the selected text.

5. The method of claim 4 wherein the selected text contains Kanji characters together with at least one of Hiragana and Katakana characters and only the at least one of Hiragana and Katakana characters are replaced.

6. The method of claim 1 wherein the selected text is displayed in a typeface font.

7. The method of claim 1 further comprising the following steps:

on the display screen, replacing the selected text with the top ranked candidate text string;

determining whether a correction gesture has been made with the stylus on the top ranked candidate text string displayed on the screen, said correction gesture allowing said top ranked text candidate to be corrected; and if so, displaying a menu listing at least a portion of the of candidate text strings from the destination text domain in the order ranked.

8. The method of claim 7 further comprising the following steps:

determining whether one of the plurality of candidate text strings has been selected from the menu; and if so, replacing the displayed top ranked candidate text string with the selected candidate text string.

9. The method of claim 1 wherein the step of determining whether the stylus has been used to enter a conversion gesture further includes a step of determining whether a bounding box of the conversion gesture intersects a bounding box of the selected text.

10. A method of converting characters from one text domain to another text domain in a stylus-based computer in which information may be entered by interaction of a stylus with a display screen, the method comprising the following steps:

(a) identifying selected text that has been delineated by a selection gesture input by the stylus on the display screen;

(b) identifying a conversion gesture input by the stylus and having a bounding box overlapping a bounding box of the selected text on the display screen;

(c) determining the source text domain of the selected text;

(d) determining an appropriate destination text domain to which the selected text is to be converted;

(e) identifying for the conversion one or more candidate text strings from the destination text domain;

(f) ranking the one or more candidate text strings such that a single top ranked candidate is identified; and (g) replacing the selected text on the display screen with the top ranked candidate identified in step f.

11. The method of claim 10 further comprising:

identifying a correction gesture performed on top ranked candidate displayed in step g; and displaying a menu listing at least some of the candidate text strings in the order ranked.

12. The method of claim 11 further comprising:

identifying a selected candidate from among those displayed on the menu; and replacing the top ranked candidate displayed in step g with the selected candidate.

* * * * *